United States Patent [19]

Maeng

[11] Patent Number: 5,249,089

[45] Date of Patent: Sep. 28, 1993

[54] DRIVING DEVICE FOR LOADING/UNLOADING A TRAY FOR A DIGITAL AUDIO TAPE

[75] Inventor: Hyun J. Maeng, Anyang, Rep. of Korea

[73] Assignee: Goldstar Alps Electronics Co. Ltd., Seoul, Rep. of Korea

[21] Appl. No.: 737,975

[22] Filed: Jul. 30, 1991

[51] Int. Cl.⁵ .................... G11B 5/008; G11B 15/675
[52] U.S. Cl. ..................................... 360/96.5; 360/83
[58] Field of Search ................. 360/96.5, 83, 85, 93

[56] References Cited

U.S. PATENT DOCUMENTS

| | | | |
|---|---|---|---|
| 5,036,413 | 7/1991 | Kishimoto | 360/96.5 |
| 5,038,237 | 8/1991 | Kim | 360/96.5 |
| 5,062,015 | 10/1991 | Maeng | 360/96.5 |
| 5,136,442 | 8/1992 | Yamashita | 360/96.5 |

FOREIGN PATENT DOCUMENTS 1-292661 11/1989 Japan .................. 360/96.5

*Primary Examiner*—Stuart S. Levy
*Assistant Examiner*—Paul J. Ditmyer

[57] ABSTRACT

A driving device for loading/unloading a tray for a digital audio tape in a tray type cassette apparatus of a digital audio tape player, which device enables to load-/unload the tray by utilizing the existing capstan and loading motors without using a separate exclusive driving motor. The driving is arranged such that power may be intermittently transmitted from a transmission gear of the cassette loading apparatus through an intermediate gear, a bevel gear, an up-and-down gear, an input gear and the capstan motor to a cam gear depending upon upwardly and downward movements of the up-and-down gear.

3 Claims, 4 Drawing Sheets

DRIVING DEVICE FOR LOADING/UNLOADING A TRAY FOR A DIGITAL AUDIO TAPE

BACKGROUND OF THE INVENTION

1. Field of the Invention

This invention relates to a driving device for loading/unloading a tray in a tray type cassette loading apparatus of a digital audio tape player which is the subject matter of U.S. Pat. application Ser. No. 07/455,178 filed Dec. 22, 1989 now U.S. Pat. No. 5,062,015.

2. Description of the Prior Art

FIG. 1 of the accompanying drawings illustrates in a perspective view a tray type cassette loading apparatus as disclosed in a prior application in the name of the applicant of this application, which apparatus comprises a cassette holder(1); an up-and-down plate(3) mounted on the cassette holder (1) to be rotatable by means of a shaft (2); a tray(4) connected to the cassette holder (1) and the up-and-down plate(3) to be movable horizontally; opposite brackets (5) fixedly disposed in parallel on opposite sides of a main base to support the cassette holder (1), the up-and-down plate(3) and the tray(4); a cam gear (7) comprising an integrally formed inner intermittent gear (7a) (depicted by the chain line) meshed with a rack of the tray (4), an outer gear (7b) formed on its entire circumference to be meshed with a transmission gear(8), and a cam groove (7c) formed in its inner surface, and mounted on one of the brackets(5) to be rotatable by means of a rotary shaft(9); and up-and-down holder (11) pivotally coupled to rear ends of the opposite brackets (5) through a shaft (10) to rotate the up-and-down plate (3); a cam lever(13) connected at its rear end to the shaft (10) and having at its forward end a pin (12) received in the cam groove (7c), and thus pivoting the up-and-down holder (11); an adjusting piece (14) having a projection (14a) and disposed in contact with a bent portion (11a) of the up-and-down holder(11); and a spring(15) connected at opposite ends to the up-and-down holder(11) and the cam lever (13) to extent between them.

The cam groove(7c) of the cam gear (7) is comprised of a snail-shaped groove having a first section for a horizontal movement of a cassette, a second section for a vertical movement of the cassette, a third section for keeping a substantially constant distance between the pin(12) of the cam lever(13) and the bent portion(11a) of the up-and-down holder(11) and allowing the cassette to have an extra stroke by applying upon the cassette pressure proportional to tensile force of the spring (15) by means of a further rotational movement of the cam lever(13), and a fourth section for preventing the cam gear (7) from reversely rotating by means of restoring force of the spring (15). With this construction, tape loading/unloading operation may be carried out with the horizontal and vertical movements of a tape (not shown) loaded into the cassette holder (1), in accordance with the complex movements of the parts as described above. For further details of the operation of the loading apparatus, because reference may be made to the above-mentioned prior application of this applicant, the description is omitted herein to avoid duplication.

In order to load/unload the tape by horizontally and vertically moving the cassette holder (1) of the tray (4), the cam gear (7) rotatively driven by means of the rotary shaft (9) horizontally moves the tray (4) through the rack (6) of the tray, which is meshed with the inner intermittent gear (7a) provided on the inner side of the cam gear, and vertically moves the tray through the pin (12) of the cam lever (13), which moves along the cam groove (7c) formed in the inner side of the cam gear. In this manner, in order to rotate the cam gear (7) for moving the cassette, there are needed a drive unit is required for transmitting power to the cam gear, and a suitable control means for the drive unit.

SUMMARY OF THE INVENTION

It is an object of the present invention to provide a driving device for loading/unloading a tray for a digital audio tape, which transmits and breaks off power by using capstan and loading motors provided essentially to a cassette, without additionally mounting a separate exclusive motor providing driving force for the tray type cassette loading apparatus as described above.

To achieve the above object, there is provided according to one embodiment of the present invention a driving device for loading/unloading a tray for a digital audio tape in a tray type cassette loading apparatus of a digital audio tape player, which comprises a cassette holder; an up-and-down plate mounted on the cassette holder to be rotatable by means of a shaft; the tray having a rack and connected to the cassette holder and the up-and-down plate for movement with them; opposite brackets fixedly disposed in parallel on opposite sides of a main base to support the cassette holder, the up-and-down plate and the tray; a cam gear comprising an integrally formed inner intermittent gear meshed with the rack of the tray, an outer gear formed on its entire circumference to be meshed with a transmission gear, and a cam groove having multistep sections and formed in its inner surface, and mounted on one of the brackets to be rotatable by means of a rotary shaft; an up-and-down holder coupled to rear ends of the opposite brackets through a shaft of the up-and-down plate; a cam lever connected at its rear end to the shaft of the up-and-down holder and having at its forward end a pin received in the cam groove, and thus pivoting the up-and-down holder; a position adjusting piece having a projection and secured to the cam lever in contact with a bent portion of the up-and-down holder; and a spring connected at opposite ends to the up-and-down holder and the cam lever to extend between them; the driving device characterized by comprising an intermediate gear meshed with the transmission gear to be rotated thereby; a bevel gear disposed on rear side of a body and meshed with the intermediate gear to change a transmission path of a rotational driving force to a direction of 90 degrees; an up-and-down gear movable up and down between the bevel gear and an input gear receiving power of a capstan motor, by means of an up-and-down lever pivotable by a sliding plate, so as to intermittently transmit the power from the input gear to the bevel gear; and switching means disposed on one side of a top cover to be switched on and off in response to contact with an engaging protrusion formed on the cam gear.

BRIEF DESCRIPTION OF THE DRAWINGS

The invention will be more fully understood from the following detailed description thereof, taken in connection with the accompanying drawings, in which.

DESCRIPTION OF THE PREFERRED EMBODIMENT

Figure 1:
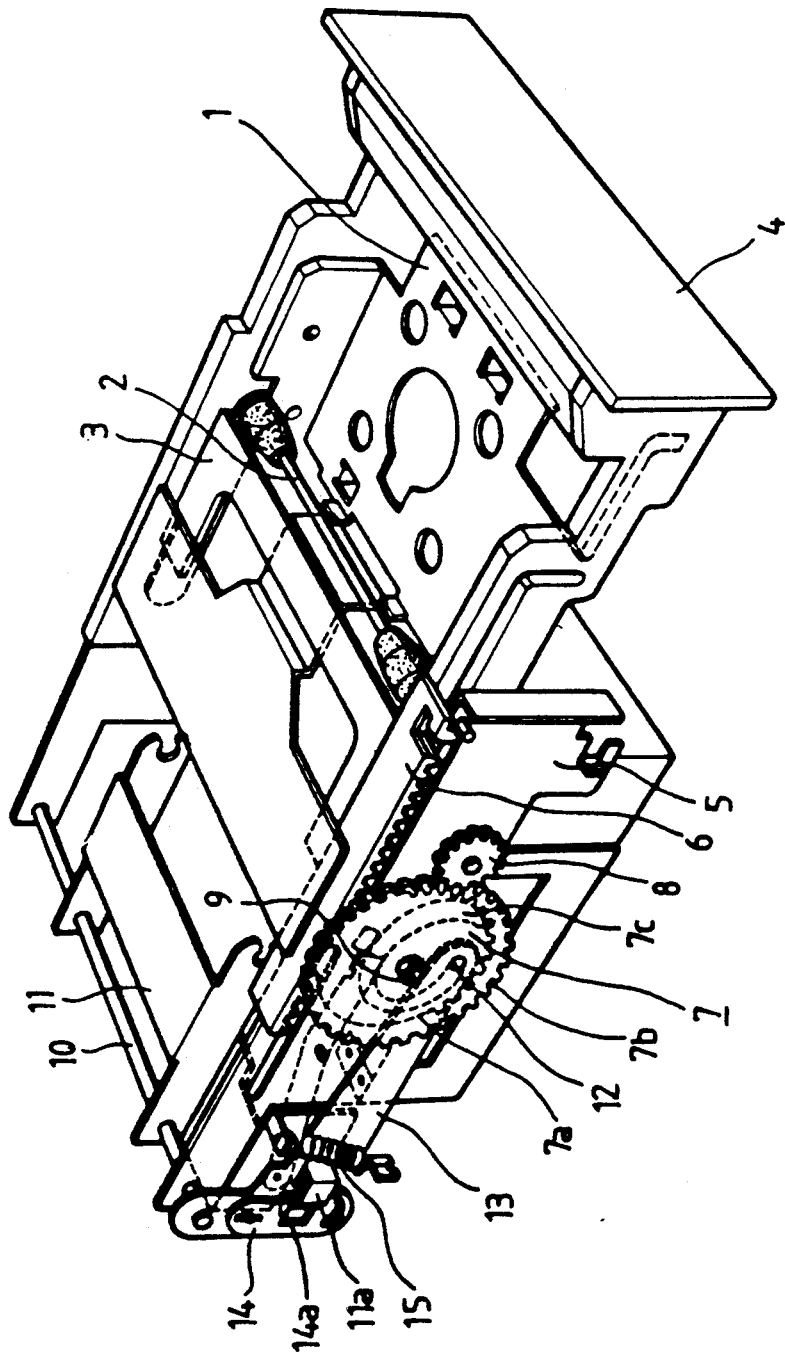
FIG. 1 is a perspective view of a tray type cassette loading apparatus.
Figure 2:
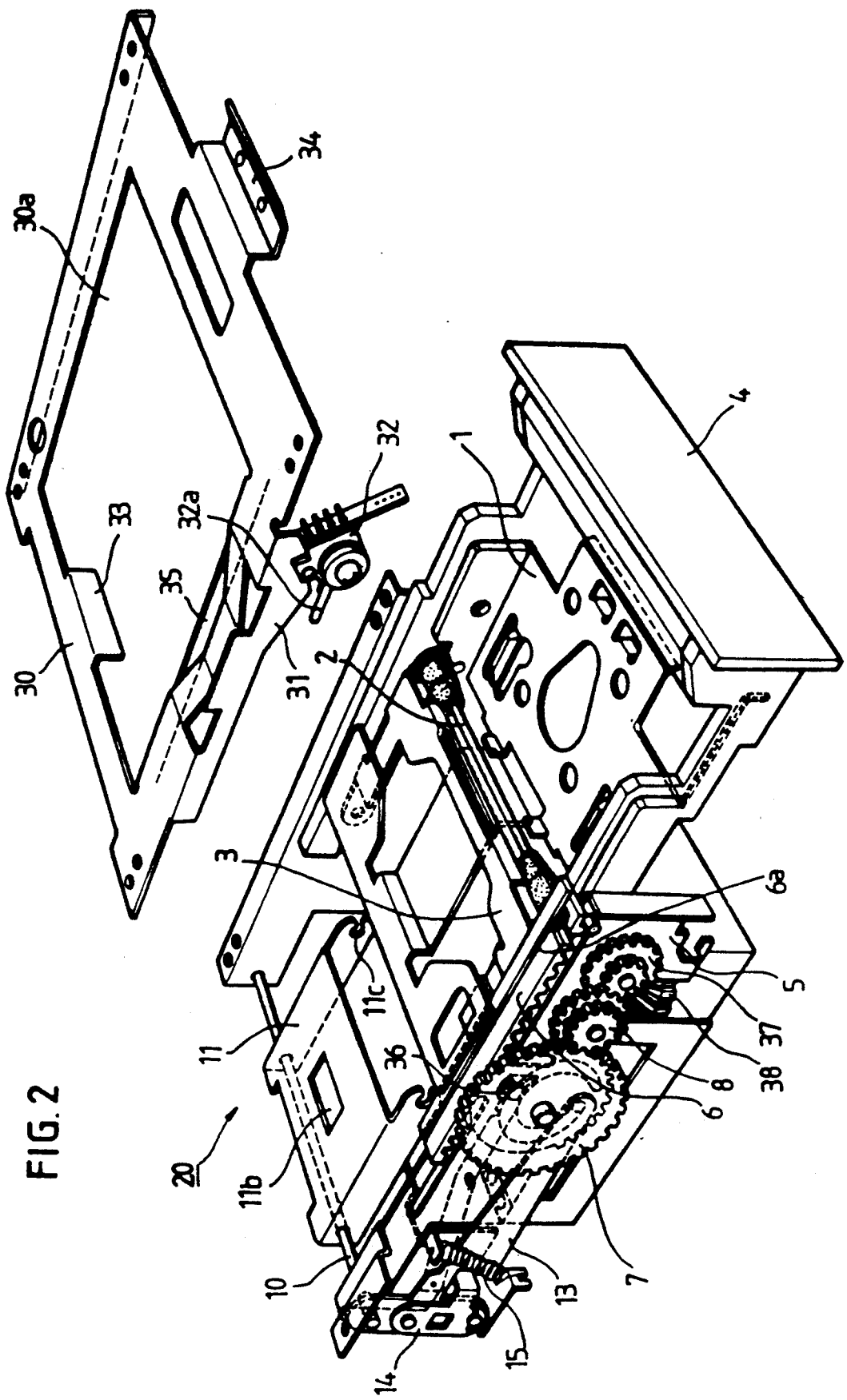
FIG. 2 is an exploded perspective view of the entire cassette loading apparatus incorporating a driving device for loading/unloading a tray according to the present invention.

Referring first to FIG. 2 showing in a perspective view a tray type cassette loading apparatus incorporating the present invention, a top cover(30) is attached to a top of a body (20) having a tray (4). The top cover has a protruding piece(31) formed integrally on one side thereof (adjacent to a cam gear(7) mounted on the body (20)) and having switching means, i.e., a lever type contact switch (32) attached thereto. At this time, the reason for attaching the top cover(30) to the top of the body(20) is to prevent generation of an oscillation and a noise and occurrence of misoperation due to insufficient support of the top-open body during a movement or other relevant operation of the tray (4), and maintain structural integrity of the entire body (20).

In addition, the top cover (30) has a rectangular opening (30a) formed at its central portion and a bent piece (33) depending downwardly from a rear edge of the opening (30a). The bent piece (33) is inserted into a center aperture (11b) of an up-and-down holder (11) of the body (20), which is located below to bent piece when assembled, the prevent the up-and-down holder from rocking right and left during its pivotal movement about a shaft (10) and allow one side of an up-and-down plate(3) to be always exactly inserted into grooves of upper brackets (11c) of the up-and-down holder (11). There is also formed centrally of a leading edge of the top cover (30) a generally L-shaped engaging jaw(34) to prevent a tape (not shown) being loaded into a cassette holder (1) from being damaged due to misinsertion thereof. Besides, a downwardly protruding, elongated guide piece (35) is formed on one side of the rectangular opening(30a) of the top cover (30) to be inserted into a guide groove (6a) of a rack (6) of the body(20), thereby guiding a sliding movement of the tray(4) during the loading/unloading operation.

Figure 3:
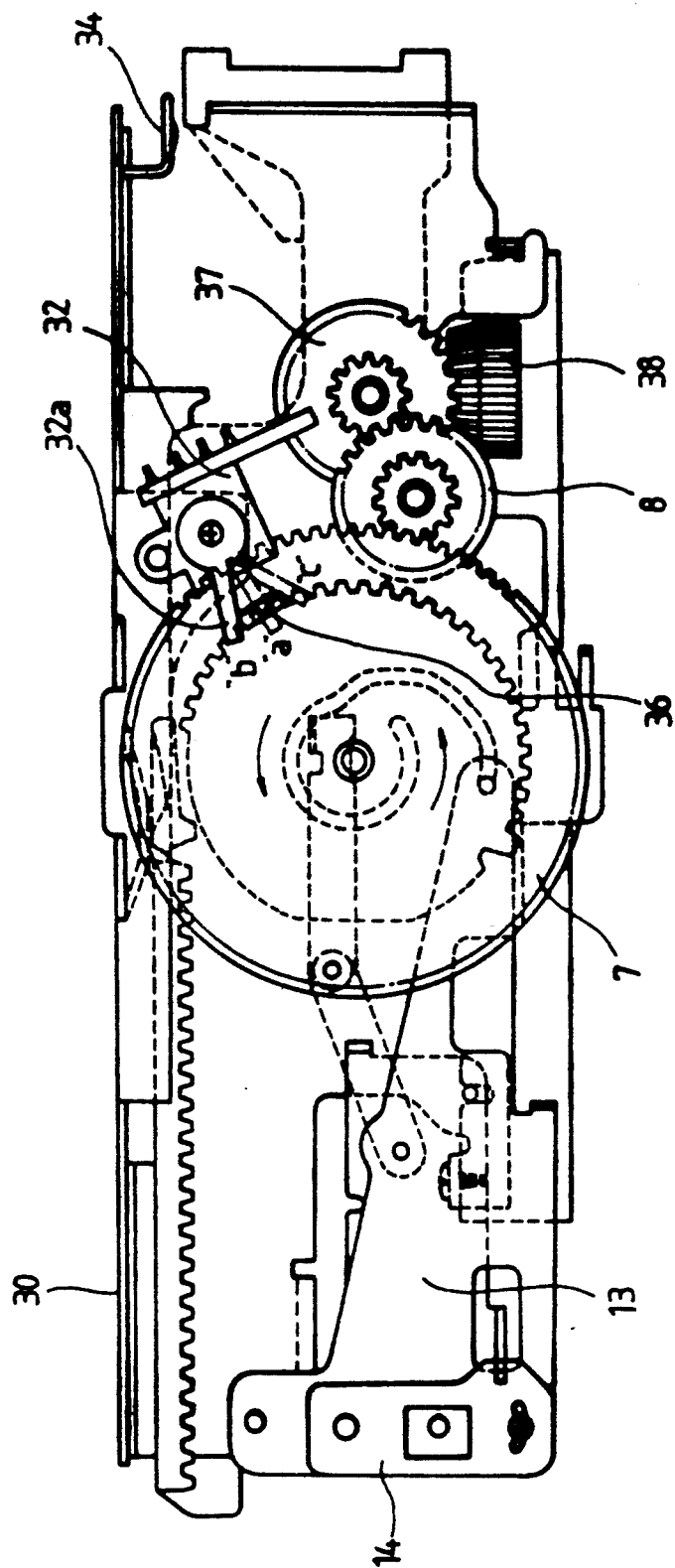
FIG. 3 is a side view for explaining relationship between a cassette switch and a cam gear when a cassette is loaded in place.
Figure 4A:
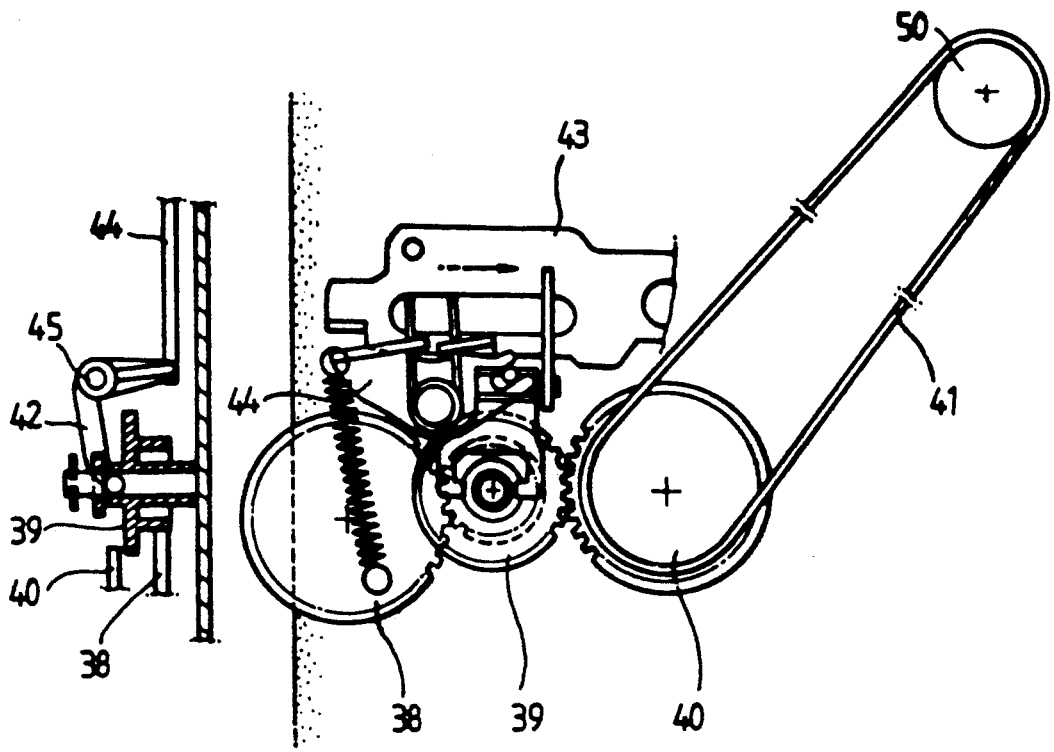
FIG. 4a is an explanatory view of a power transmission system in a play mode.

When the top cover (30) performing the various fuctions as discussed above is assembled to the body(20), as shown in FIG. 3, a contact terminal(32a) of the switch (32) secured to the top cover comes into contact with an engaging protrusion (36) formed on the cam gear (7) of the body (20) in accordance with rotation of the cam gear, thereby effecting ON and OFF functions of the switch (32). Also, an intermediate gear (37) is disposed to be engaged with a transmission gear (8) which is in turn meshed with the cam gear (7) of the body (20), while a bevel gear (38) is arranged on rear side of the body to be meshed with the intermediate gear (37), thereby changing a transmission path of a rotational driving force through them to a direction of 90 degrees. In this manner, the power changes direction at an angle of 90 degrees by the bevel gear (38) may be transmitted through an up-and-down gear (39) engaged with the bevel gear (38), an input gear (40) engaged with the up-and-down gear (39), and an endless belt (41) running around the input gear (40) and a driving pulley of a capstan motor (50) driving a drum (not shown), as shown in FIG. 4a illustrating in plan view a back side of the body. While the power transmission path is described above in the reverse order from the cam gear (7) to the capstan motor (50), power is actually transmitted from the belt (41) to the input gear(40), the up-and-down gear(39), the bevel gear(38) and the intermediate gear(37) to the cam gear (7). At this time, since the up-and-down (39) between the bevel gear (38) and the input gear (40) is arranged to be movable up and down, the power transmission is intermitted in response to the upward and downward movements of the up-and-down gear.

Figure 4B:
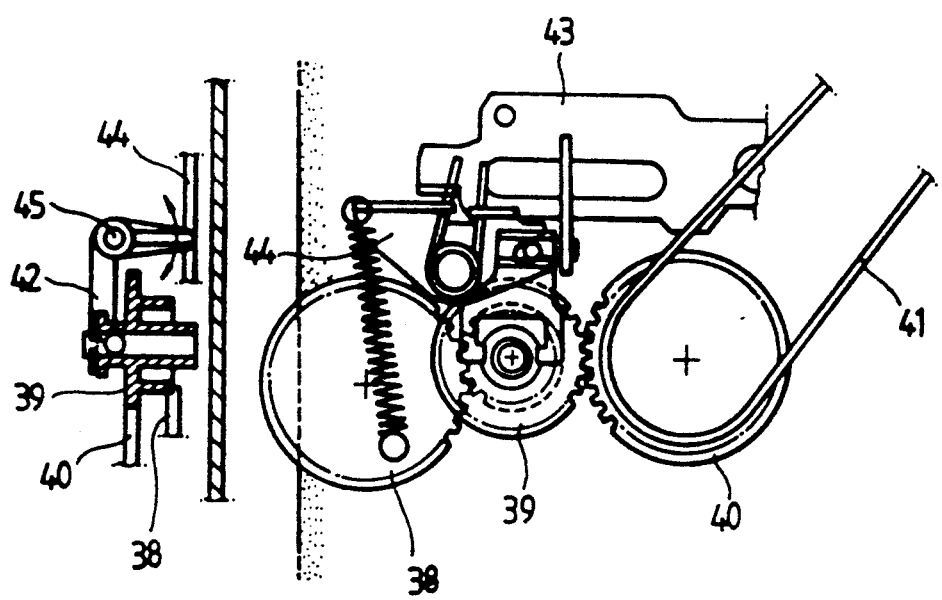
FIG. 4b is an explanatory view of a power transmission system during tape eject operation.

FIG. 4a illustrates the up-and-down gear (39) in a lowered condition, in which the gear (39) is out of engagement with the input gear (40), thereby breaking off the power being transmitted to the bevel gear (38). On the contrary, FIG. 4b illustrates a condition wherein the up-and-down gear (39) is elevated to be engaged with the input gear (40), thereby transmitting the power to the bevel gear. The upward and downward movements of the up-and-down gear (39) may be carried out by a pivotal movement of a L-shaped up-and-down lever (42) which contacts the up-and-down gear, while the pivotal movement of the up-and-down lever(42) in the direction of the arrow about a rotary shaft (45) may be accomplished by a bracket (44) which is movable depending on a sliding movement of sliding plate (43) and connected to the up-and-down lever.

Operation of this device in a play mode or an eject mode will now be described below. First, in a condition as shown in FIG. 2, in which the tray(4) is open to permit the tape to be put into the cassette holder (1), all motions are in an OFF state. At this point, as shown in FIG. 4a, the up-and-down gear(39) is lowered to be out of engagement with the input gear(40). In this position, when a relevant switch (not shown) is actuated to close the tray (4), the following steps of the operation are carried out:

1. The capstan motor(50) rotates in response to the actuation of the switch.

2. The input gear (40) rotates through the endless belt (41).

3. At the same time, the sliding plate (43) is moved in accordance with actuation of a loading motor (not shown) to pivot the up-and-down lever(42) about the shaft (45). As a result, the up-and-down gear(39) is elevated to be meshed with the input gear (40), as in the condition shown in FIG. 4b.

4. As power of the capstan motor (50) is transmitted to the cam gear (7) through the input gear (40), the up-and-down gear (39), the bevel gear(38) and the intermediate gear(37), the cam gear rotates to cause the horizontal movement of the tray (4) and the descent of the cassette holder (1), whereby the tape is seated on reels while a cover of the tape is being open.

5. In this condition, when according to further rotation of the cam gear (7) the engaging protrusion(36) formed on the cam gear actuates the contact terminal (32a) of the switch (32) to displace the contact terminal from Position "a" in FIG. 3 to Position "b", the loading motor reversely rotates to descend the up-and-down gear(39) to the position as shown in FIG. 4a in the reverse order of that described above.

6. In the condition shown in FIG. 4a, wherein the up-and-down gear(39) is lowered, a desired play operation may be carried out with rotation of the capstan motor (50). That is, the condition of FIG. 4a is for a play mode of the apparatus.

In this state, when a opening switch is actuated in order to stop the play operation and open the tray(4) again, the cam gear (7) is reversely rotated in the reverse order of the operations as discussed above, thereby opening the tray. That is, in the power transmission state as shown in FIG. 4b, the gear is reversely rotated in a direction opposed to the direction in the closing operation as stated above, thereby presenting a tape eject condition. At this time, when the tray(4) is completely ejected, and thus the switch (32) is turned off, the up-and-down gear (39) may again be lowered to the position shown in FIG. 4a in response to the reverse rotation of the loading motor, thereby interrupting the power transmission. In this manner, the reason for interrupting the power transmission by the actuation of the loading motor is to maintain a disengagement condition of the gears, thereby permitting the open tray to be manually closed without depending upon the automatic closing operation in response to the actuation of the switch.

As described above, the present invention provides an efficient device serving to move the tray by utilizing a rotational driving force of the existing capstan motor which performs the play function, without necessitating a separate exclusive motor for the movement of the tray, thereby resulting in lower manufacturing cost, and compaction and simplicity in construction.

Having described a preferred embodiment of this invention, it will be apparent that many changes and modifications can be made therein without departing from the spirit and scope of the invention as defined in the appended claims.

What is claimed is:

1. A driving device for loading/unloading a tray for a digital audio tape in combination with tray type cassette loading apparatus of a digital audio tape player, said tray type cassette loading apparatus including,
    a cassette holder,
    an up-and-down plate, rotatably mounted on said cassette holder,
    a tray having a rack and connected to said cassette holder and said up-and-down plate,
    opposite brackets, fixedly disposed in parallel on opposite sides of a main base to support said cassette holder, said up-and-down plate, and said tray,
    a cam gear including an integrally formed inner intermittent gear, meshed with said rack of said tray, an outer gear meshed with a transmission gear, and a cam groove having multistep sections, and rotatably mounted on one of said opposite brackets,
    an up-and-down holder, coupled to said opposite brackets through a shaft to rotate said up-and-down plate,
    a cam lever connected to a shaft of said up-and-down holder and including a pin for receipt in said cam groove for pivoting said up-and-down holder,
    a position adjusting piece including a projection and secured to said cam lever in contact with a bent portion of said up-and-down holder, and
    a spring connected to said up-and-down holder and said cam lever,
said driving device comprising:
    an intermediate gear meshed with said transmission gear to be rotated thereby;
    a bevel gear engaged with sad intermediate gear to change a transmission path of a rotational driving force by 90 degrees;
    an up-and-down gear movable between said bevel gear and an input gear receiving power from a capstan motor, by means of an up-and-down lever pivotable by a sliding plate, so as to intermittently transmit the power from said input gear to said bevel gear; and
    switching means disposed on one side of a top cover for switching on and off in response to contact with an engaging protrusion formed on said cam gear.

2. The driving device for loading/unloading a tray for a digital audio tape of claim 1, wherein said top cover has a rectangular opening at a central portion, a bent piece formed on a rear edge of said opening, and a generally L-shaped engaging jaw formed centrally on a forward edge of said opening.

3. The driving device for loading/unloading a tray for a digital audio tape of claim 2, wherein said top cover further comprises a bent guide piece formed on one side of said opening.

* * * * *